US009893823B2

(12) United States Patent
Li et al.

(10) Patent No.: US 9,893,823 B2
(45) Date of Patent: Feb. 13, 2018

(54) SEAMLESS LINKING OF MULTIPLE AUDIO SIGNALS

(71) Applicant: Silicon Laboratories Inc., Austin, TX (US)

(72) Inventors: Junsong Li, Austin, TX (US); John Allen, Dripping Springs, TX (US)

(73) Assignee: Silicon Laboratories Inc., Austin, TX (US)

( * ) Notice: Subject to any disclaimer, the term of this patent is extended or adjusted under 35 U.S.C. 154(b) by 103 days.

(21) Appl. No.: 14/805,656

(22) Filed: Jul. 22, 2015

(65) Prior Publication Data

US 2017/0024183 A1 Jan. 26, 2017

(51) Int. Cl.
*G06F 17/00* (2006.01)
*H04H 20/22* (2008.01)

(52) U.S. Cl.
CPC .................................... *H04H 20/22* (2013.01)

(58) Field of Classification Search
CPC .... G06F 3/165; H04H 2201/18; H04H 40/81; H04H 60/12; H04H 2201/183; H04H 2201/186; H04H 20/22
See application file for complete search history.

(56) References Cited

U.S. PATENT DOCUMENTS

| | | | | |
|---|---|---|---|---|
| 8,417,206 | B2 | 4/2013 | Allen et al. | |
| 9,001,945 | B2 | 4/2015 | Elenes et al. | |
| 2013/0003637 | A1 * | 1/2013 | Elenes | H04H 60/12 370/312 |
| 2013/0279700 | A1 * | 10/2013 | Whitecar | H04H 60/12 381/3 |
| 2014/0355764 | A1 | 12/2014 | Elenes et al. | |
| 2016/0241350 | A1 * | 8/2016 | Nekhamkin | G10L 19/0019 |

OTHER PUBLICATIONS

Silicon Labs, "Si4704/05-D60, Broadcast FM Radio Receiver With RDS/RBDS," Rev. 1.2, Aug. 2013, 39 pages.

* cited by examiner

*Primary Examiner* — Joseph Saunders, Jr.
(74) *Attorney, Agent, or Firm* — Trop. Pruner & Hu, P.C.

(57) ABSTRACT

In one embodiment, an apparatus includes: a first demodulator to demodulate a digital signal into a first demodulated audio signal; a second demodulator to demodulate an analog signal into a second demodulated audio signal, the first and second demodulated audio signals including common content; and a delay determination circuit to determine a delay value between the common content of the two demodulated audio signals based at least in part on a first delay estimate having a first resolution and a second delay estimate having a second resolution.

18 Claims, 5 Drawing Sheets

SEAMLESS LINKING OF MULTIPLE AUDIO SIGNALS

BACKGROUND

Digital radios receive a digital radio spectrum that provides improved fidelity, as well as additional features. Currently in the United States, digital radio is available over-the-air using sidebands to an analog carrier signal. The current system as commercialized in the United States is referred to as so-called HD™ radio. By way of these sidebands, a broadcaster can provide one or more additional complementary channels to an analog carrier signal.

Accordingly, digital or HD™ radios can receive these signals and digitally demodulate them to provide a higher quality audio signal that includes the same content as an analog radio signal, or to provide additional content to the analog radio signal such as supplementary broadcasting available on one or more supplemental digital channels. Typically, a digital radio tuner is incorporated in a radio solution that also includes a conventional analog spectrum receiver for handling demodulation of the analog carrier signal.

In some situations such as depending on received quality of one or more of these differently modulated signals, a radio may be configured to combine or blend information from the different signals. However, this often leads to processing complexity and possibly leads to audible artifacts that are undesired by a listener.

SUMMARY OF THE INVENTION

In one aspect, an apparatus such as a radio includes: a first demodulator to demodulate a digital signal into a first demodulated audio signal; a second demodulator to demodulate an analog signal into a second demodulated audio signal, where the first and second demodulated audio signals include common content; and a delay determination circuit to determine a delay value between the common content of the two demodulated audio signals based at least in part on a first delay estimate having a first resolution and a second delay estimate having a second resolution.

In an example, the delay determination circuit is to output the first demodulated audio signal and the second demodulated audio signal such that the common content is at least substantially synchronized. The delay determination circuit may include: a first estimator to generate the first delay estimate based on a first plurality of samples of the first demodulated audio signal obtained at a first sample rate and a first plurality of samples of the second demodulated audio signal obtained at the first sample rate, during a first time window; and a second estimator to generate the second delay estimate based on a second plurality of samples of the first demodulated audio signal obtained at a second sample rate and a second plurality of samples of the second demodulated audio signal obtained at the second sample rate, during a second time window.

In an example, the first estimator may be configured to calculate cross-correlations between the first plurality of samples of the first demodulated audio signal and the first plurality of samples of the second demodulated audio signal, and the second estimator may be configured to calculate cross-correlations between the second plurality of samples of the first demodulated audio signal and the second plurality of samples of the second demodulated audio signal.

In an example, a monitor circuit may be configured to: associate a first confidence value with the first delay estimate based at least in part on a value of a maximum cross-correlation between the first plurality of samples of the first demodulated audio signal and the first plurality of samples of the second demodulated audio signal; and associate a second confidence value with the second delay estimate based at least in part on a value of a maximum cross-correlation between the second plurality of samples of the first demodulated audio signal and the second plurality of samples of the second demodulated audio signal.

In an example, a storage may be configured to store, for a first radio channel, the delay value and a confidence level based at least in part on the first confidence value and the second confidence value.

The delay determination circuit may include: an encoder to encode a selected one of the first demodulated audio signal and the second demodulated audio signal; and a first buffer to store an amount of the encoded selected one of the first demodulated audio signal and the second demodulated audio signal, where the first buffer is to be read based on the first delay estimate. The delay determination circuit may further include: a decoder to decode the encoded selected first or second demodulated audio signal output from the first buffer; and a second buffer to store the decoded selected first or second demodulated audio signal, where the second buffer is to be read based at least in part on the second delay estimate.

In an example, a blender circuit may be configured to blend the first demodulated audio signal and the second demodulated audio signal, where the blender circuit coupled to an output of the delay determination circuit. In an example, the delay determination circuit comprises a control circuit to control an output rate for the first demodulator and the second demodulator at a common rate, and the first demodulator comprises a first sample rate converter to convert the first demodulated audio signal from a native rate to the common rate and to output the first demodulated audio signal to the delay determination circuit at the common rate, the common rate slower than the native rate.

In another aspect, an apparatus comprises: a first digital demodulator to demodulate a first digital signal into a first demodulated audio signal; an analog demodulator to demodulate an analog signal into a second demodulated audio signal; a second digital demodulator to demodulate a second digital signal into a third demodulated audio signal; and a linker circuit coupled to the first digital demodulator, the analog demodulator, and the second digital demodulator. The linker circuit may be configured to identify a delay between common content of at least the first and second demodulated audio signals according to a multi-resolution delay estimate. This multi-resolution delay estimate may be based at least in part on a first resolution delay estimate and a second resolution delay estimate.

In an example, the linker circuit comprises: a first estimator to generate the first resolution delay estimate based on a first plurality of samples of the first demodulated audio signal obtained at a first sample rate and a first plurality of samples of the second demodulated audio signal obtained at the first sample rate, during a first time window; and a second estimator to generate the second resolution delay estimate based on a second plurality of samples of the first demodulated audio signal obtained at a second sample rate and a second plurality of samples of the second demodulated audio signal obtained at the second sample rate, during a second time window.

In an example, the linker circuit further comprises a third estimator to generate a third resolution delay estimate based on a third plurality of samples of the first demodulated audio signal and a third plurality of samples of the second demodulated audio signal, during a third time window. The linker circuit may further comprise a control circuit to receive the first resolution delay estimate, the second resolution delay estimate and the third resolution delay estimate and to generate the multi-resolution delay estimate therefrom.

In an example, the control circuit is configured to generate the multi-resolution delay estimate from less than all of the first, second and third resolution delay estimates, based on a confidence level associated with one or more of the delay estimates.

In an example, the linker circuit comprises: an encoder to encode a selected one of the first and second demodulated audio signals; and a first buffer to store an amount of the encoded selected one of the first and second demodulated audio signals, where the first buffer is to be read based on the first resolution delay estimate.

The linker circuit may further comprise: a decoder to decode the encoded selected first or second demodulated audio signal output from the first buffer; and a second buffer to store the decoded selected first or second demodulated audio signal, where the second buffer is to be read based at least in part on the multi-resolution delay estimate.

In yet another aspect, a method includes: determining in a first time window, in a linker circuit of a receiver, a first delay estimate between common content of a first demodulated audio signal and a second demodulated audio signal; storing an undelayed one of the first and second demodulated audio signals in a first buffer; outputting the undelayed demodulated audio signal from the first buffer according to the first delay estimate; and providing, at least substantially synchronously, common content of the undelayed demodulated audio signal output from the first buffer and a delayed one of the first demodulated audio signal and the second demodulated audio signal to a blender circuit.

In an example, the method further comprises storing the undelayed demodulated audio signal in the first buffer according to a first encoding, decoding the undelayed demodulated audio signal output from the first buffer, and storing the undelayed demodulated audio signal in a second buffer. The method may further include outputting the undelayed demodulated audio signal from the second buffer according to a final delay estimate based on at least one of the first delay estimate, a second delay estimate, and a third delay estimate.

In a still further aspect, a non-transitory storage medium may store instructions to enable a system including a radio to perform the above methods.

DETAILED DESCRIPTION

In many receiver systems, incoming content is received via multiple tuners. As examples, analog and digitally modulated signals can be received and processed. In some situations, embodiments provide techniques to seamlessly link audio content received from different broadcast signals that carry the same audio content. More specifically, embodiments provide techniques to time align the audio content, as each broadcast may be received with significant and different audio processing delays. Such techniques may be used to switch seamlessly from one broadcast means to another in order to avoid service disruption, in the face of limited geographic coverage of radio signals.

Figure 1:
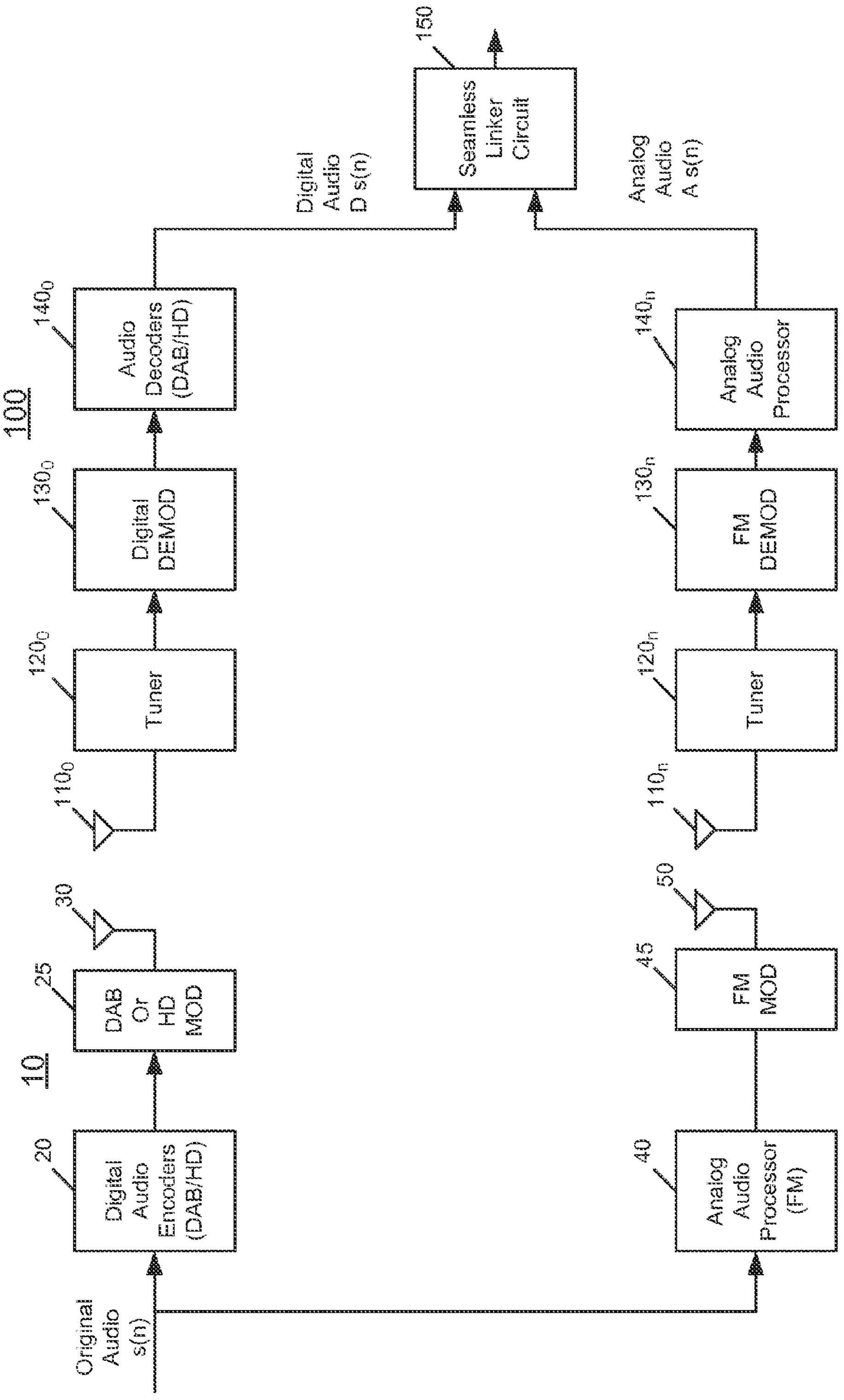
FIG. 1 is a block diagram of an environment in accordance with an embodiment.

Referring to FIG. 1, shown is a block diagram of an environment in accordance with an embodiment. More specifically, in FIG. 1 multiple systems are present, which represent a global radio environment including transmitters and receivers. In the example of FIG. 1, a transmitter corresponds to systems present at a given broadcaster, such as a radio station. As seen, transmission system 10 receives an incoming original audio signal, s(n), and provides the signal to multiple signal paths, including a first signal path having one or more digital audio encoders 20 to digitally encode the original audio signal, which may correspond to a given content collection such as played music, original broadcasting content, recordings or so forth. After appropriate encoding in encoders 20, such as a digital audio broadcast (DAB) encoder and/or an HD™ encoder, the encoded digital audio signals are provided to a corresponding modulator 25 (e.g., a DAB and or HD™ modulator). In turn, the modulated signals are transmitted via an antenna 30. As an example, antenna 30 may be a transmission antenna to provide broadcast radio signals within a local environment. Of course other types of broadcast, narrowcast and or unicast systems are contemplated.

In addition to digital encoding and transmission, analog encoding and transmission of the same content may occur via an analog audio processor 40 and an FM modulator 45, to be output via an antenna 50. Note that in some cases a single antenna may be used to output the modulated signals of both signal paths. Furthermore, understand while shown with two signal paths, one or more additional signal paths may be present in other examples. Understand also while described herein in the context of FM signals, where the digitally modulated signals may be provided in one or more sidebands to a main channel, other types of modulation schemes are possible.

Still with reference to FIG. 1, a receiver system 100 is present. In various examples, receiver system 100 may be a multi-tuner receiver, which may be implemented on one or more semiconductor dies (e.g., of one or more integrated circuits (IC's)). In one representative example, system 100 may be a receiver of a car stereo system to be incorporated in a given car. In other cases, receiver 100 may be part of a radio tuner for a portable device, a stereo device or any other type of electronic device.

In the example shown, multiple signal processing paths are provided. A first signal processing path includes an antenna $\mathbf{110}_0$ that provides received signals to a tuner $\mathbf{120}_0$. Antenna $\mathbf{110}_0$ may be configured to receive various types of incoming radio frequency (RF) signals including, for example, digital broadcast signals such as FM broadcast signal as sidebands to analog broadcast signals that may include the same or different content, e.g., modulated according to a digital modulation scheme, other terrestrial signals, satellite signals, or so forth. In general, tuner $\mathbf{120}_0$, which in an embodiment may be implemented as a given IC, may include analog front end circuitry, downconversion circuitry, analog-to-digital conversion (ADC) circuitry and possibly additional processing circuitry such as a digital front end to perform at least some digital processing on the digitized signals. The digitized signals are provided to a demodulator $130_0$ which may demodulate signals for the given type of modulation performed by transmission system 10. In turn, the demodulated signals are provided to one or more audio decoders $140_0$ for decoding the encoded demodulated signals to obtain a resulting digital audio signal (Ds(n)).

A second signal processing path includes an antenna $110_n$ that provides received signals to a tuner $120_n$. Antenna $110_n$ may be configured to receive various types of incoming RF signals including, for example, analog broadcast signals. In general, tuner $120_n$ also may include analog front end circuitry, downconversion circuitry, ADC circuitry and possibly additional processing circuitry. The digitized signals are provided to a demodulator $130_n$ which in the embodiment shown is an FM demodulator. In turn, the demodulated signals are provided to analog audio processor $140_n$ for decoding the encoded demodulated signals to obtain a resulting analog audio signal (As(n)).

In the specific example shown, the second RF signal corresponds to an analog signal of a conventional broadcast radio station and the first RF signal corresponds to a digital signal of that same radio broadcast. However, these two RF signals, which are in a relatively close bandwidth with respect to each other, may include substantially the same content or information, but modulated according to different modulation schemes (e.g., the analog signal modulated according to an FM scheme, while the digital signal is modulated according to, e.g., an orthogonal frequency division multiplexing (OFDM) scheme). As used herein, the terms "digital radio" and "HD™ radio" are used interchangeably and are intended to correspond to radio communication that occurs digitally, e.g., as one or more sideband channels to a main analog signal channel. Such communications may be in accordance with various standards such as a National Radio System Committee (NRSC-5C), Digital Audio Broadcasting, Digital Radio Mondiale or other standard. This digital communication is also known as in-band on-channel (IBOC) broadcasting.

Currently, many broadcasters transmit a bundled signal including both analog and digital information. The analog information is a conventional radio channel and may have a single sided bandwidth of approximately 100 kilohertz (kHz), centered around a carrier frequency at a midpoint of a channel spectrum that is approximately 200 kHz wide. In addition, one or more digital channels can be encoded into sidebands to this main signal channel. Because this information is in digital form various other information in addition to audio information, such as textual data, e.g., song titles, station information, news and so forth can be present. Also, the digital radio channels may have higher quality sound than the analog channel.

As seen, the audio signals of the processing paths are provided to a seamless linker circuit 150. As described herein, linker circuit 150 may be configured to determine a delay between the signals communicated via the different signal processing paths, to enable smooth blending and/or switching of an output of linker circuit 150. That is, by way of blending and/or selection of an appropriate output from linker circuit 150, a user cannot perceive any delay between the signal paths, and blending and/or switching operations occur in a manner seamlessly to a listener.

Note that due to design considerations and/or signal impairments, signals processed can suffer from various deleterious effects. For example, analog audio processor 40 may output signals at a level with compressed audio having a reduced dynamic range. As another example, digital demodulators $130_0$ may suffer from weak signals, synchronization loss, or high bit error rate. FM demodulator $130_n$ may perform dynamic channel bandwidth control to deal with blocker channels, and hence analog audio processor $140_n$ may receive weak signals and perform various processing to deal with noise, such as hi-cut and/or mute processing. Note that embodiments may take into account such impairments and other effects in determining a delay between common content of different signal processing paths.

Figure 2:
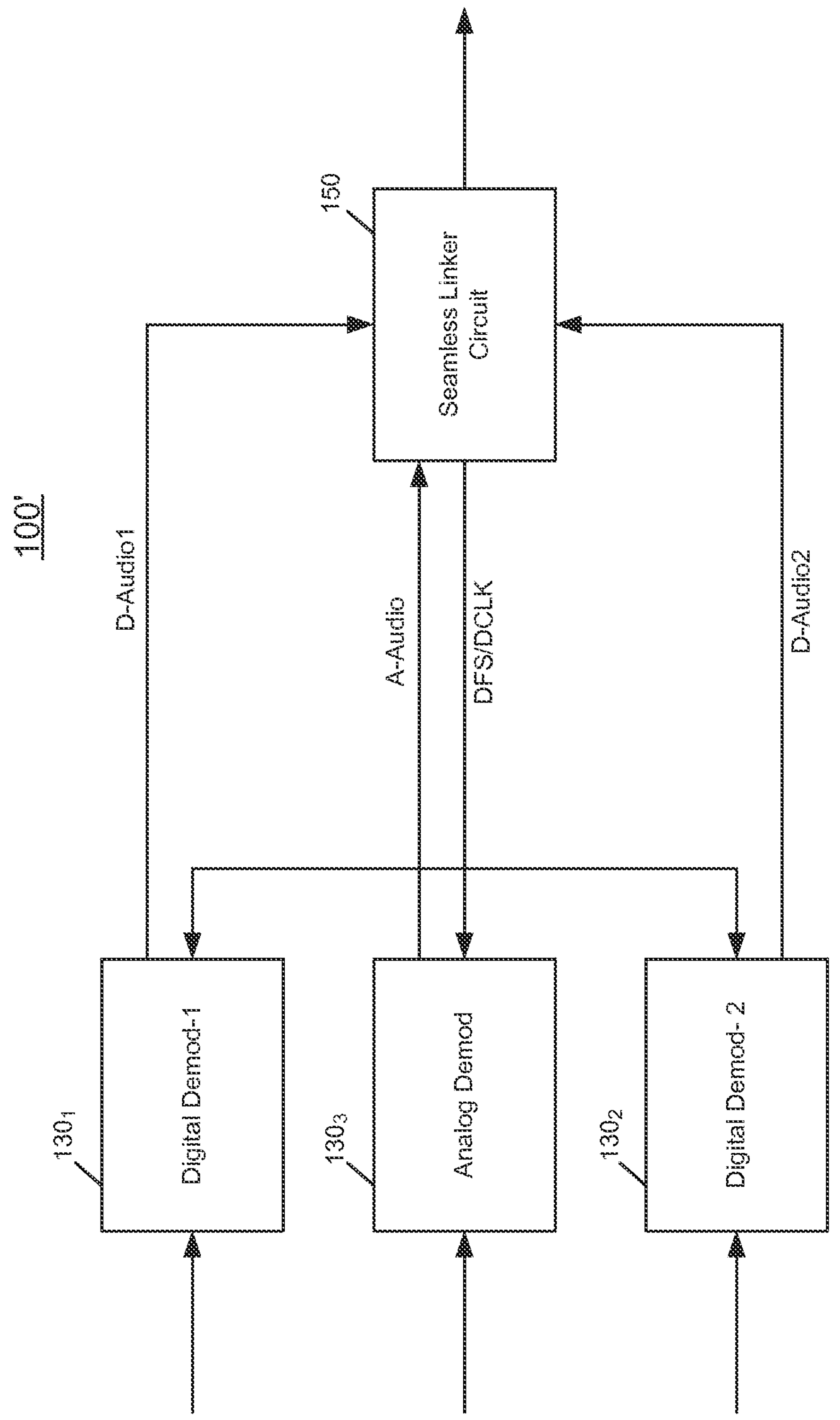
FIG. 2 is a block diagram of a high level view of a portion of a receiver in accordance with an embodiment.

Referring now to FIG. 2, shown is a block diagram of a high level view of a portion of a receiver in accordance with an embodiment. In the embodiment shown in FIG. 2, receiver 100' includes multiple demodulators $130_1$-$130_3$, namely multiple digital demodulators $130_1$/$130_2$ and an analog demodulator $130_3$. Each of these demodulators is configured to receive a demodulated signal (after appropriate processing in a front end circuit (not shown for ease of illustration in FIG. 2)). The resulting demodulated audio signal is provided to linker circuit 150.

To enable delay determinations and blending to be performed as described herein, linker circuit 150 may be configured to act as a master to cause the demodulated output of demodulators 130 to be provided at a single, common sampling rate. To this end, in the embodiment shown in FIG. 2, linker circuit 150 may communicate a clock signal, e.g., via an $I^2S$ slave bus, to each of demodulators 130, to cause the corresponding demodulator to output demodulated signals at this clock rate. In one embodiment, linker circuit 150 may control demodulators 130 to output information at a sampling rate of 44.1 kilosamples per second (kS/s). Of course other sampling rates are possible in different embodiments. Note also that this selected sample rate may be lower than a native sampling rate of one or more of demodulators 130. To this end, each of demodulators 130 may include one or more sample rate converters to convert processed, demodulated signals from a native clock rate to this common sampling rate. By causing demodulators 130 to output demodulated signals at a common rate, processing complexity for linker circuit 150 may be simplified. Still further, as the sample rate may be lower than a native clock rate for the corresponding demodulator, data consumption and power consumption reductions may be achieved. Understand while shown at this high level in the example of FIG. 2, many variations and alternatives are possible.

Figure 3:
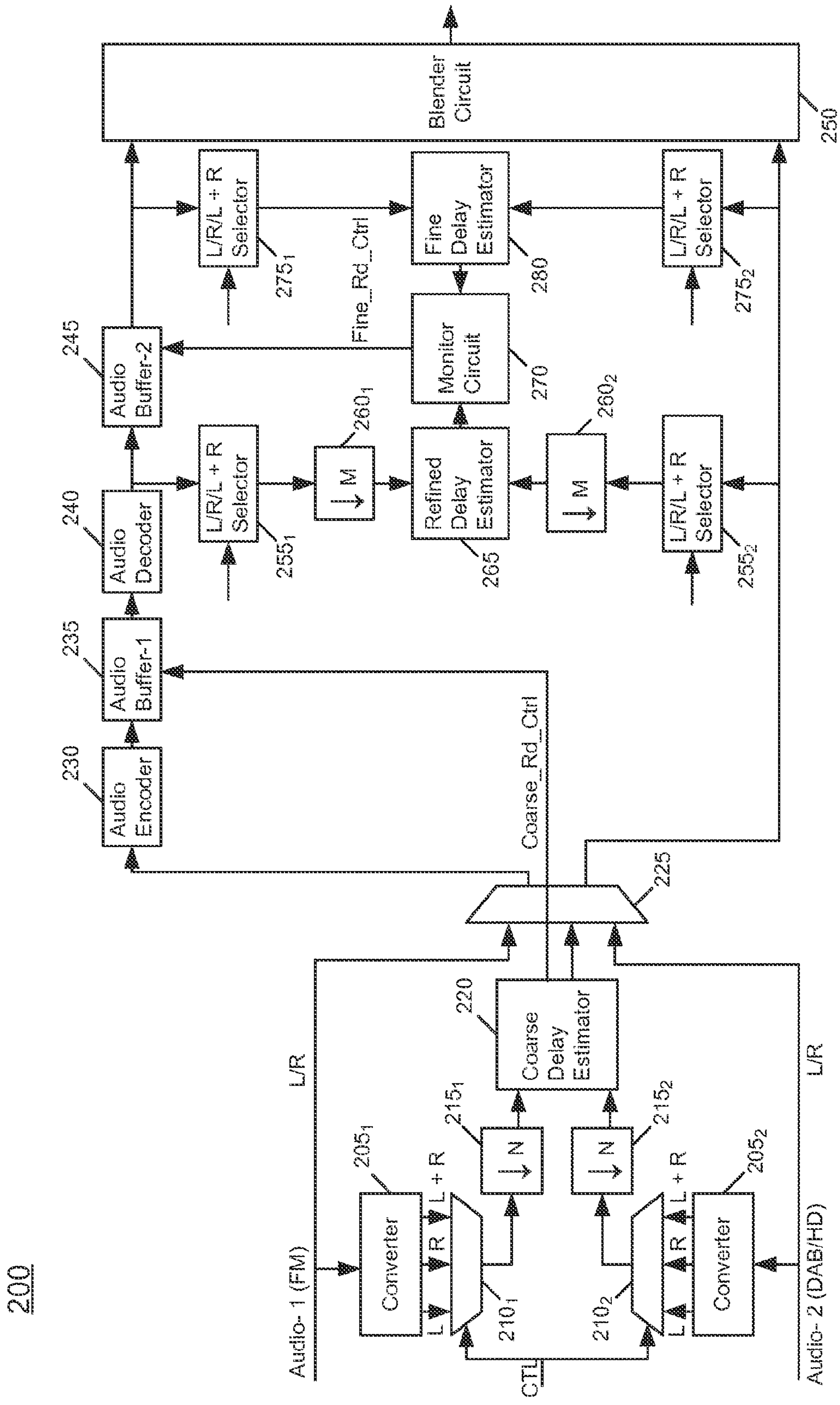
FIG. 3 is a block diagram of a linker circuit in accordance with an embodiment.

Referring now to FIG. 3, shown is a block diagram of a linker circuit 200 in accordance with an embodiment. As one example, linker circuit 200 may correspond to linker circuit 150 shown in FIGS. 1 and 2. In general, linker circuit 200 is configured with a multi-resolution delay estimator circuit to determine, at multiple resolutions, a delay between two or more different signal paths processing content according to different modulation/demodulation schemes (e.g., one or more of FM, DAB, HD™, and/or other schemes).

The multi-resolution delay estimator circuit may be configured to determine a similarity between two or more audio streams. While different measures of determining similarity of content are possible, in one embodiment a cross-correlation may be used to measure similarity between two audio streams. For example, given two audio signals {x(n)} and {y(n)} having a number of samples n= . . . 0, 1, 2, 3, . . . :

$$R_{xy}(k) = \frac{1}{\|x(n)\|x\|y(n)\|}\sum_{n=-\infty}^{+\infty} x(n)y(n+k);$$

Rxy(k)≤1.0, for all k; and $R_{xy}(m)=1$, only if $x(n)=y(n+m)$, where $R_{xy}$ is a given cross-correlation.

The multi-resolution delay estimator circuit may operate to obtain sufficient data (e.g., buffering audio samples from the multiple signal processing paths), calculate a cross-correlation between the samples of the different paths, and search for a global peak value of the multiple cross-correlations. In turn, the delay associated with the global peak value may be selected as the optimal delay estimate. However, calculating cross-correlations for a large number of samples can be computationally and memory intensive. Accordingly, embodiments provide a multi-resolution delay estimation process using a limited number of samples within multiple different time windows.

In general, the multi-resolution delay estimator may operate to coarsely determine a first delay estimate, which thus identifies which of the signal paths is delayed with respect to the other(s), provide buffering means for the undelayed signal path, and control the output of such buffering means to enable common content of the multiple signal paths to be provided synchronously to a blender circuit. Still further, the multi-resolution delay estimator circuit may perform such delay determination and processing at very low complexity and computation expense, reducing power consumption and also reducing the amount of processing resources and storage to be used for determining an appropriate delay.

In FIG. 3, components of an analog audio processing path (receiving L/R signals) are discussed. As seen, the audio signals are provided to a converter 205$_1$, which converts the L/R signals into L, R, and L+R signals, provided to a multiplexer 210$_1$. A selected one of these signals is provided from multiplexer 210$_1$ (which is controlled by a control signal CTL, that in turn may be API controllable). As seen, the selected audio signal is provided to a decimator 215$_1$, which reduces the sampling rate of the audio signal. In one embodiment, decimator 215$_1$ may be configured as a decimate-by-128 to greatly reduce the sampling rate. The reduced sample rate audio signals are provided to a coarse delay estimator 220. As seen, coarse delay estimator 220 further receives another reduced sample rate audio signal (e.g., a DAB/HD™ signal), which may similarly be processed by converter 205$_2$, multiplexer 210$_2$, and decimator 215$_2$ of a second signal processor path, all controlled to operate similarly to the same components of the FM processing path.

Coarse delay estimator 220 is configured to coarsely determine a delay between these two signals. In an embodiment, estimator 220 may perform a cross-correlation on the two signals to determine which signal is delayed and further to determine a first estimate (e.g., a coarse estimate) of such delay. Coarse delay estimator 220 may generate the coarse delay globally at a large time scale. In one example, blocks of one audio stream (e.g., approximately a 1 second block) may be used to run a pattern search, e.g., a cross-correlation, against the other audio stream. In an embodiment, coarse delay estimator 220 may be configured to perform this delay estimation based on a global search within a time frame of approximately 20 seconds. Estimator 220 also may be configured to determine a delay estimate to a resolution of between approximately 2-3 milliseconds (ms), in an embodiment.

Based on the determination by estimator 220 as to which signal path is delayed, multiplexer 225 provides the undelayed audio signal to a processing path including an audio encoder 230, a first audio buffer 235, an audio decoder 240, and an second audio buffer 245, an output of which is provided to blender circuit 250. In turn, the delayed audio signal is provided directly from multiplexer 225 to blender circuit 250. Furthermore, the coarse delay determined by delay estimator 220 may be provided to buffer 235, which as discussed below may be controlled to output audio samples based on this coarse delay estimate.

In an embodiment, audio encoder 230 may encode the incoming audio samples by compressing them according to a given compression format, to reduce storage requirements. In one embodiment, an MPEG-4 compression format may be used. These compressed audio signals may then be stored in audio buffer 235.

Still with reference to FIG. 3, audio information in audio buffer 235 may be read out under control of a coarse read control signal, provided by coarse delay estimator 220. This read control signal provides the coarse estimate of the delay so that the output of audio buffer 235 may be more closely aligned with the delayed signal path. In an embodiment this coarse read control signal may be used by audio buffer 235 as a read pointer. When output from audio buffer 235 the encoded audio samples are provided to audio decoder 240, which may perform the reverse decoding. Thus in like manner, audio decoder 240 may apply a decompression technique, e.g., in accordance with the MPEG-4 compression described above.

From audio decoder 240, the audio samples are provided to another selector 255$_1$ to select corresponding L/R or L+R signals to be provided to a decimator 260$_1$. In an embodiment, decimator 260$_1$ may be a decimate-by-16 to reduce sample rate. These reduced sample rate audio samples are provided to a refined delay estimator 265, along with corresponding sampled versions of the delayed signal, via selector 255$_2$ and decimator 260$_2$.

In an embodiment, refined delay estimator 265 may be configured to perform this delay estimate at a finer resolution (than coarse delay estimator 220). As such, refined delay estimator 265 may be configured to determine a delay estimate at a smaller time scale. For example, in one embodiment this finer resolution may be within approximately 1-2 seconds of audio samples to realize a refined delay estimate having a greater resolution, e.g., to a resolution of approximately 0.33 ms, in an embodiment. The delay estimate generated by refined delay estimator 265 is provided to a monitor circuit 270, including control circuitry and a combiner logic. Although not shown in FIG. 3, understand that the coarse delay estimate generated by coarse delay estimator 220 is also provided to monitor circuit 270.

Further as shown, a fine delay estimate generated by a fine delay estimator 280 is also provided to monitor circuit 270. In an embodiment, fine delay estimator 280 may be configured to generate a fine delay estimate, which may be done locally at a sample level (namely without decimation of the samples). In one example embodiment, this fine delay estimate may have a resolution of approximately 0.02 ms, based on local samples within 1-2 seconds of audio. As further shown in FIG. 3, selectors 275$_1$/275$_2$ select given L/R or L+R signals to be provided to fine delay estimator 280.

Based on all of these delay estimates, monitor circuit 270 may generate a confidence value associated with the given delay estimate. This confidence value may be provided to various control logic of the receiver to indicate a relative reliability of the delay estimate. In one embodiment, monitor circuit 270 may generate a confidence value for a corresponding delay estimate based on the maximum peak value of cross-correlation determined by the corresponding estimator. As discussed above, a maximum cross-correlation value of 1 is determined when samples match exactly, i.e., have the same content. As such, monitor circuit 270 may be configured to generate a confidence value based on the value of the peak cross-correlation associated with a given delay estimate, such that as the peak cross-correlation approaches 1, the confidence value approaches its maximum value (which in an embodiment also may be 1).

Note that in some embodiments, monitor circuit 270 may be configured to determine a confidence value for each individual delay estimate (coarse, refined, and fine). In one such embodiment, if all confidence levels are above a threshold value, a combined delay estimate of the multiple estimates may be used as the output of monitor circuit 270 as the read control signal to audio buffer 245. Instead if one or more of the delay estimates are associated with a confidence value below the given threshold, such delay estimate may not be used in determining the final delay estimate output by monitor circuit 270. This control signal may act as a read pointer to output audio samples such that the samples of this undelayed sample path are output by audio buffer 245 are received in blender circuit 250 synchronously (or at least substantially synchronously) with the same content of the delayed signal path. Understand also that monitor circuit 270 may store in a given storage, e.g., a non-volatile storage, an entry for each associated radio channel that includes a delay estimate (e.g., the final delay estimate) and associated confidence value. In an embodiment, monitor circuit 270 and one or more other controllers may be implemented as a microcontroller, digital state machine, or other control circuit, which may be configured to execute instructions stored in a non-transitory storage medium. Understand while shown at this high level in the illustration of FIG. 3, many variations and alternatives are possible.

Figure 4:
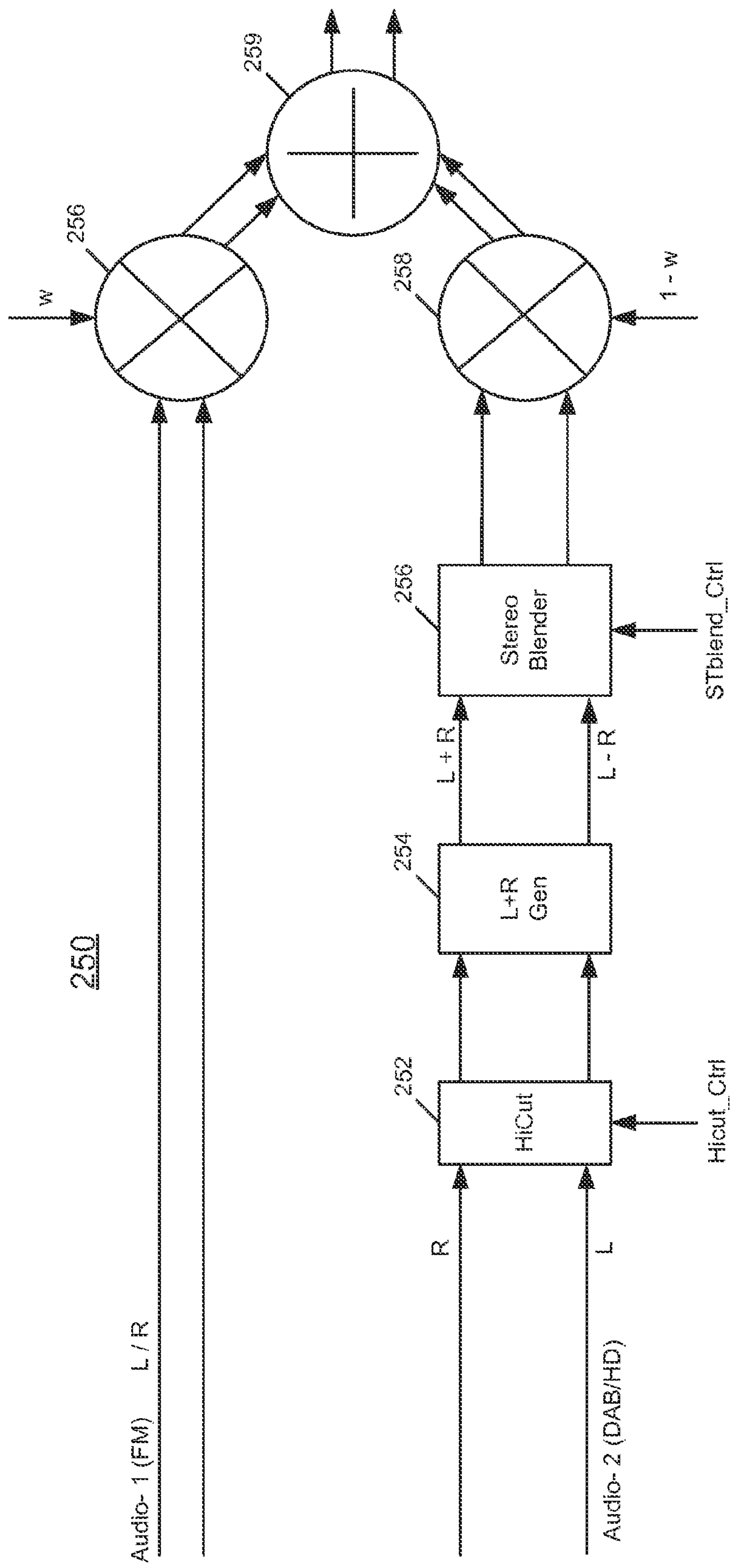
FIG. 4 is a block diagram of a blender circuit in accordance with an embodiment.

Referring now to FIG. 4, shown is a block diagram of a blender circuit in accordance with an embodiment. As shown in FIG. 4, blender circuit 250 receives incoming audio from multiple signal processing paths. In the specific implementation shown, L/R audio signals from an analog FM path are provided to a first combiner 256 and in turn, incoming L/R signals of a digital signal processing path are provided to a second combiner 258.

More specifically with regard to the digital processing path, note the presence of a hi-cut circuit 252, which may perform a hi-cut operation responsive to a hi-cut control signal. In an embodiment, hi-cut circuit 252 varies the audio frequency bandwidth according to varying signal quality metrics using a frequency bandwidth control relationship. In turn a generator circuit 254 generates L+R and L−R signals from the incoming L/R signals and provides them to a stereo blender circuit 255, which may generate a stereo output responsive to a blend control signal. More specifically, the separate L+R and L-R signals are blended together between full stereo and full mono FM audio output by stereo blender circuit 255 according to varying signal quality metrics received using a stereo blending relationship. Although not shown in FIG. 4, understand that a receiver may include one or more metrics circuitries to measure signal quality metrics (e.g., SNR, RSSI, multipath, etc.) of a modulated signal and signal quality metrics (e.g., audio SNR, DC offset, etc.) of a demodulated signal.

Note that combiners 256 and 258 are configured as multipliers to multiply the incoming audio signal with a coefficient value. More specifically, multiplier 256 multiplies the incoming audio signal with a weight coefficient W and in turn multiplier 258 multiplies its audio signal input with another coefficient value, 1−W. In an embodiment, W is a weighting factor (having a value between 0 and 1, in an embodiment) to control the blending between the two signal paths.

The multiplied outputs from combiners 256 and 258 are provided to a combiner circuit 259 to thus perform the final blending such that the output of combiner circuit 259 is a blended audio signal. Note that this blended audio signal may be directly output from a given output means such as a speaker, or there can be additional audio processing done, e.g., within the same linker circuit or one or more separate ICs, such as a separate audio processor. By appropriate control of combiners 256 and 258, blending circuit 250 may be controlled to pass the HD™ audio signal when it is available and when not available, to pass the analog audio signal. Furthermore, during a transition between the two domains, blending circuit 250 acts to blend the two signals to provide for a smooth transition between the two domains, enabling continuous radio reception so that the transition between the two domains is unnoticed by a user.

Note that depending upon signal quality metrics and available signals, there may be no blending performed, in that the output of blender circuit 250 is a selected one of an analog FM signal received via an analog signal processing path or a digital audio signal received via a digital processing path. Such control can be affected by appropriate control of weighting factor W (e.g., a weighting factor W of 1 causes the analog audio signal to be output and in turn a weighting factor W of 0 causes the digital audio signal to be output). Of course understand that other examples and other configurations of the blending circuit are possible.

Figure 5:
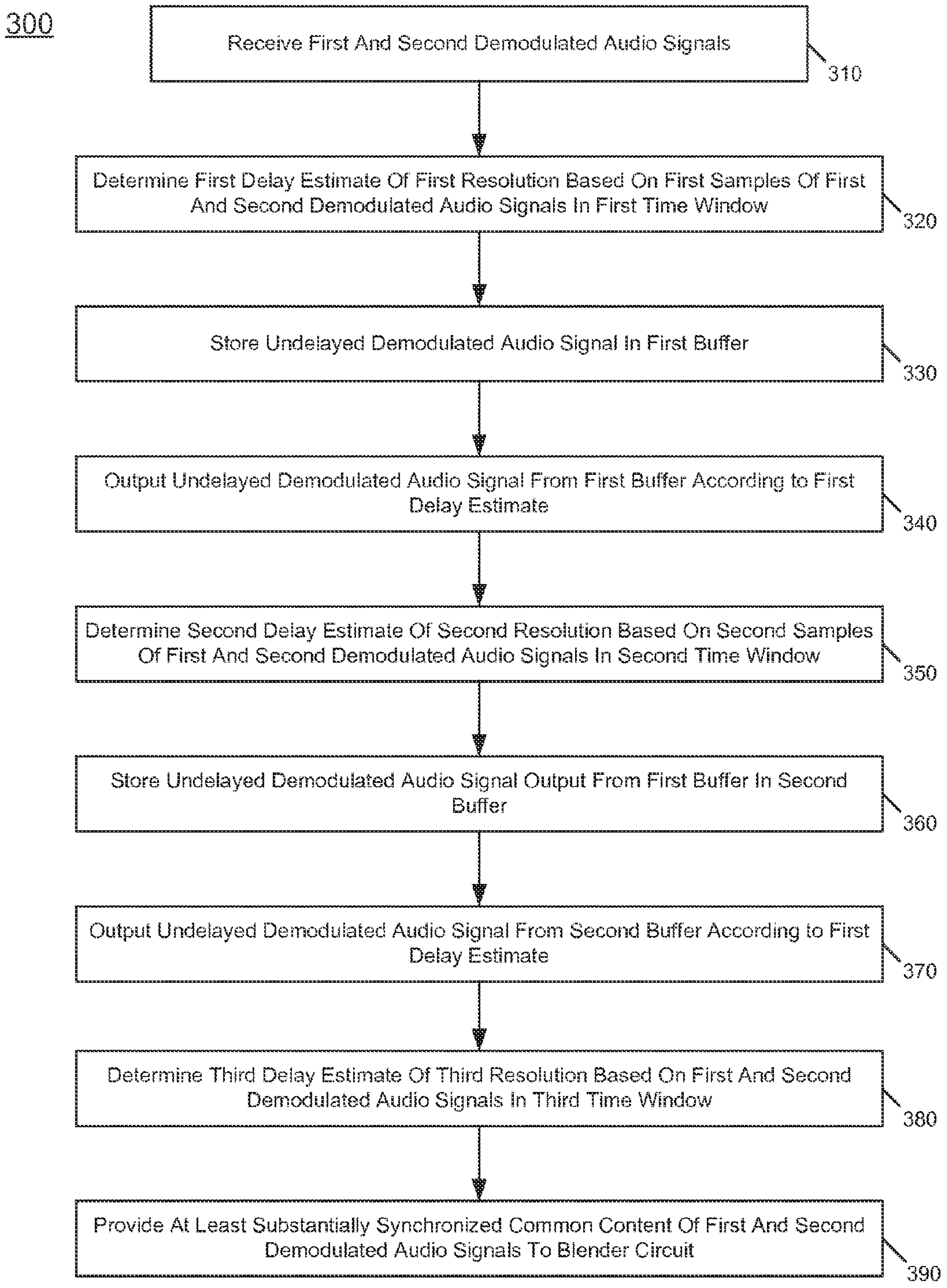
FIG. 5 is a flow diagram of a method in accordance with an embodiment.

Referring now to FIG. 5, shown is a flow diagram of a method in accordance with an embodiment. More specifically, method 300 may be performed by a multi-resolution delay estimate circuit, e.g., within a linker circuit or a digital signal processor, or as a standalone circuit. Understand that while various operations are shown serially in method 300, in different implementations operations may proceed at different times and not necessarily in the serial manner shown for ease of illustration in FIG. 5.

As seen, method 300 begins by receiving demodulated audio signals of multiple audio streams (e.g. first and second demodulated audio signals) (block 310). Next, at block 320 a first delay estimate can be determined. More specifically, this first delay estimate may be a coarse delay estimate of a first resolution based on a first number of samples of the two demodulated audio signals in a first time window. As discussed above this first time window may be a global time window, which as one example may be approximately 20 seconds.

At block 330, undelayed demodulated audio signals of the undelayed processing path, namely samples of the stream that is determined to be the lead stream, may be stored in a first buffer. At block 340 these samples may be output according to the first delay estimate, which may be used by this buffer as a read pointer.

Although not shown for ease of illustration in FIG. 5, understand that prior to storage in the first buffer, the samples may be compressed to reduce data storage requirements and then prior to storage into a second audio buffer, these compressed samples may be decompressed (where decompressed samples are used for both the refined delay estimate and fine delay estimate).

Still in reference to FIG. 5, at block 350 a second delay estimate can be determined between the two audio streams. More specifically, the second delay estimate may be of a second resolution and may be based on second samples of the two demodulated audio signals. This second delay estimate is thus a refined delay estimate and may be based on a given number of samples within a smaller time window, such as approximately 1-2 seconds.

Thereafter at block 360 samples output from the first buffer may be stored into a second buffer. These buffered samples may then be output according to a final delay estimate (block 370). Understand that this final delay estimate used to control the output of read buffer may in fact be a combined delay estimate that incorporates one or more of the coarse delay estimate, the refined delay estimate and the fine delay estimate, as explained above.

Still in reference to FIG. 5, at block 380 a third delay estimate, namely the fine delay estimate, can be determined between the two audio streams. More specifically, the third delay estimate may be of a third resolution and may be based on third samples of the two demodulated audio signals. This third delay estimate is thus a fine delay estimate and may be based on samples of a smaller time window, such as approximately 1-2 seconds.

Still referring to FIG. 5, at block 390 common content of these two demodulated audio signals may be provided, at least substantially synchronously, to a blender circuit to enable appropriate blending between the common content. Understand while shown at this high level in the embodiment of FIG. 5, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
- a first demodulator to demodulate a digital signal into a first demodulated audio signal;
- a second demodulator to demodulate an analog signal into a second demodulated audio signal, the first demodulated audio signal and the second demodulated audio signal including common content; and
- a delay determination circuit to determine a delay value between the common content of the first demodulated audio signal and the common content of the second demodulated audio signal based at least in part on a first delay estimate having a first resolution and a second delay estimate having a second resolution, wherein the delay determination circuit comprises:
  - an encoder to encode a selected one of the first demodulated audio signal and the second demodulated audio signal; and
  - a first buffer to store an amount of the encoded selected one of the first demodulated audio signal and the second demodulated audio signal, wherein the first buffer is to be read based on the first delay estimate.

2. The apparatus of claim 1, wherein the delay determination circuit is to output the first demodulated audio signal and the second demodulated audio signal such that the common content is at least substantially synchronized.

3. The apparatus of claim 1, wherein the delay determination circuit comprises:
- a first estimator to generate the first delay estimate based on a first plurality of samples of the first demodulated audio signal obtained at a first sample rate and a first plurality of samples of the second demodulated audio signal obtained at the first sample rate, during a first time window; and
- a second estimator to generate the second delay estimate based on a second plurality of samples of the first demodulated audio signal obtained at a second sample rate and a second plurality of samples of the second demodulated audio signal obtained at the second sample rate, during a second time window.

4. The apparatus of claim 3, wherein:
- the first estimator is to calculate cross-correlations between the first plurality of samples of the first demodulated audio signal and the first plurality of samples of the second demodulated audio signal; and
- the second estimator is to calculate cross-correlations between the second plurality of samples of the first demodulated audio signal and the second plurality of samples of the second demodulated audio signal.

5. The apparatus of claim 4, further comprising a monitor circuit to:
- associate a first confidence value with the first delay estimate based at least in part on a value of a maximum cross-correlation between the first plurality of samples of the first demodulated audio signal and the first plurality of samples of the second demodulated audio signal; and
- associate a second confidence value with the second delay estimate based at least in part on a value of a maximum cross-correlation between the second plurality of samples of the first demodulated audio signal and the second plurality of samples of the second demodulated audio signal.

6. The apparatus of claim 5, further comprising a storage to store, for a first radio channel, the delay value and a confidence level based at least in part on the first confidence value and the second confidence value.

7. The apparatus of claim 1, wherein the delay determination circuit further comprises:
- a decoder to decode the encoded selected first or second demodulated audio signal output from the first buffer; and
- a second buffer to store the decoded selected first or second demodulated audio signal, wherein the second buffer is to be read based at least in part on the second delay estimate.

8. The apparatus of claim 1, further comprising a blender circuit to blend the first demodulated audio signal and the second demodulated audio signal, the blender circuit coupled to an output of the delay determination circuit.

9. The apparatus of claim 1, wherein the delay determination circuit comprises a control circuit to control an output rate for the first demodulator and the second demodulator at a common rate, and the first demodulator comprises a first sample rate converter to convert the first demodulated audio signal from a native rate to the common rate and to output the first demodulated audio signal to the delay determination circuit at the common rate, the common rate slower than the native rate.

10. An apparatus comprising:
- a first digital demodulator to demodulate a first digital signal into a first demodulated audio signal;
- an analog demodulator to demodulate an analog signal into a second demodulated audio signal;
- a second digital demodulator to demodulate a second digital signal into a third demodulated audio signal; and
- a linker circuit coupled to the first digital demodulator, the analog demodulator, and the second digital demodulator, wherein the linker circuit is to identify a delay between common content of at least the first demodulated audio signal and the second demodulated audio signal according to a multi-resolution delay estimate, the multi-resolution delay estimate based at least in part on a first resolution delay estimate and a second resolution delay estimate.

11. The apparatus of claim 10, wherein the linker circuit comprises:

a first estimator to generate the first resolution delay estimate based on a first plurality of samples of the first demodulated audio signal obtained at a first sample rate and a first plurality of samples of the second demodulated audio signal obtained at the first sample rate, during a first time window; and a second estimator to generate the second resolution delay estimate based on a second plurality of samples of the first demodulated audio signal obtained at a second sample rate and a second plurality of samples of the second demodulated audio signal obtained at the second sample rate, during a second time window.

12. The apparatus of claim 11, wherein the linker circuit further comprises a third estimator to generate a third resolution delay estimate based on a third plurality of samples of the first demodulated audio signal and a third plurality of samples of the second demodulated audio signal, during a third time window.

13. The apparatus of claim 12, wherein the linker circuit further comprises a control circuit to receive the first resolution delay estimate, the second resolution delay estimate and the third resolution delay estimate and to generate the multi-resolution delay estimate therefrom.

14. The apparatus of claim 13, wherein the control circuit is to generate the multi-resolution delay estimate from less than all of the first resolution delay estimate, the second resolution delay estimate and the third resolution delay estimate, based on a confidence level associated with one or more of the first resolution delay estimate, the second resolution delay estimate and the third resolution delay estimate.

15. The apparatus of claim 10, wherein the linker circuit comprises:

an encoder to encode a selected one of the first demodulated audio signal and the second demodulated audio signal; and a first buffer to store an amount of the encoded selected one of the first demodulated audio signal and the second demodulated audio signal, wherein the first buffer is to be read based on the first resolution delay estimate.

16. The apparatus of claim 15, wherein the linker circuit further comprises:

a decoder to decode the encoded selected first or second demodulated audio signal output from the first buffer; and a second buffer to store the decoded selected first or second demodulated audio signal, wherein the second buffer is to be read based at least in part on the multi-resolution delay estimate.

17. A non-transitory storage medium including instructions that when executed enable a system to:

determine in a first time window, in a linker circuit of a receiver, a first delay estimate between common content of a first demodulated audio signal and a second demodulated audio signal based on a first number of samples of the first demodulated audio signal and the second demodulated audio signal;

store an undelayed one of the first demodulated audio signal and the second demodulated audio signal in a first buffer according to a first encoding;

output the undelayed demodulated audio signal from the first buffer according to the first delay estimate;

decode the undelayed demodulated audio signal output from the first buffer;

store the undelayed demodulated audio signal in a second buffer; and provide, at least substantially synchronously, common content of the undelayed demodulated audio signal output from the first buffer and a delayed one of the first demodulated audio signal and the second demodulated audio signal to a blender circuit.

18. The non-transitory storage medium of claim 17, further comprising instructions that when executed enable the system to output the undelayed demodulated audio signal from the second buffer according to a final delay estimate based on at least one of the first delay estimate, a second delay estimate, and a third delay estimate.

* * * * *